(12) United States Patent
McGregor

(10) Patent No.: US 10,562,476 B2
(45) Date of Patent: Feb. 18, 2020

(54) GUARD ASSEMBLY FOR A MACHINE

(71) Applicant: Caterpillar Inc., Deerfield, IL (US)

(72) Inventor: Scott Andrew McGregor, Lisle, IL (US)

(73) Assignee: Caterpillar Inc., Peoria, IL (US)

(*) Notice: Subject to any disclaimer, the term of this patent is extended or adjusted under 35 U.S.C. 154(b) by 44 days.

(21) Appl. No.: 16/020,217

(22) Filed: Jun. 27, 2018

(65) Prior Publication Data

US 2020/0001808 A1    Jan. 2, 2020

(51) Int. Cl.
*B60R 19/38* (2006.01)
*B60R 19/52* (2006.01)
*B60R 19/02* (2006.01)
*B60R 21/00* (2006.01)

(52) U.S. Cl.
CPC ............ *B60R 19/38* (2013.01); *B60R 19/023* (2013.01); *B60R 2019/525* (2013.01); *B60R 2021/0076* (2013.01)

(58) Field of Classification Search
CPC ......... B60R 19/44; B60R 19/46; B60R 19/52; B60R 19/56; B60R 19/24; B60R 19/38; B60R 2019/522; B60R 2019/525; B60R 2019/527; B60R 2019/245; B60R 2019/247; B60R 2019/242; B60R 2021/0074; B60R 2021/0076; B60R 2021/0079; B60R 2021/0081; E02F 9/18; E02F 9/24; E02F 9/0891; E02F 9/0858

See application file for complete search history.

(56) References Cited

U.S. PATENT DOCUMENTS

| | | | | |
|---|---|---|---|---|
| 3,749,436 | A * | 7/1973 | Hitchcock | B60R 19/38 293/118 |
| 9,505,364 | B1 | 11/2016 | Schulzetenberg et al. | |
| 2006/0157993 | A1* | 7/2006 | Pendarvis | B60R 19/24 293/132 |
| 2009/0212581 | A1* | 8/2009 | Drever | B60R 19/52 293/115 |
| 2011/0260477 | A1* | 10/2011 | Martin | B60R 19/38 293/118 |
| 2013/0000999 | A1* | 1/2013 | Naito | B60R 19/52 180/68.1 |
| 2014/0306469 | A1* | 10/2014 | Drever | B60R 19/52 293/115 |
| 2016/0168823 | A1* | 6/2016 | Abe | E02F 9/24 296/190.03 |
| 2016/0312436 | A1 | 10/2016 | Nowak et al. | |
| 2017/0072888 | A1* | 3/2017 | Wubs | B60R 19/38 |
| 2018/0236955 | A1* | 8/2018 | Szurpicki | E02F 3/3414 |
| 2019/0291669 | A1* | 9/2019 | Pavlik | B60R 19/44 |

FOREIGN PATENT DOCUMENTS

WO     2010026834 A1    3/2010

* cited by examiner

*Primary Examiner* — Gregory A Blankenship

(57) ABSTRACT

A guard assembly for a machine is provided. The guard assembly includes a guard structure and a frame. The frame is attachable to the machine at a machine component. The guard structure is pivotably connected to the frame and movable between a first position and a second position. The frame further includes a magnet structure to releasably couple the frame to the machine component. Furthermore, the frame includes a cap being secured to the magnet structure. The cap includes a skin having at least one side extending beyond the magnet structure and contacting at least a portion of the machine component.

20 Claims, 11 Drawing Sheets

GUARD ASSEMBLY FOR A MACHINE

TECHNICAL FIELD

The present disclosure generally relates to a guard assembly for a machine and more particularly, to releasable coupling of the guard assembly to the machine.

BACKGROUND

Generally, heavy guards are known to be mounted on machines to provide protection to one or more components from getting damaged. For example, machines may require guards to protect the radiator/cooling system from getting damaged. Typically, for mounting such heavy guards, a solid base with mounting provisions is required, which may not always be available. In some examples, a guard assembly may be required to be mounted on a component disposed at a rear of the machine, such as on a machine counterweight. However, since the counterweights are made of cast iron, they generally do not provide provisions for mounting the guard assembly. Therefore, bolt holes have to be machined or threaded inserts have to be cast into the counterweights, which requires machine rework. Such machine rework is an expensive and labor-intensive process and hence not desirable.

U.S. Pat. No. 9,505,364 (hereinafter referred to as the '364 patent) relates to a guard apparatus for mounting on vehicle that includes a guard structure having a plurality of bars joined together and having a major plane. The guard apparatus further includes a guard mounting structure configured to mount the guard structure to the vehicle in a manner permitting movement of the major plane of the guard structure between a first position and a second position. The guard apparatus of the '364 patent further includes a guard securing structure configured to secure the guard structure in the first position and release the guard structure to move toward the second position. The guard securing structure may be configured to secure the guard structure in the first position using magnetic attraction force.

SUMMARY OF THE INVENTION

In one aspect, a guard assembly for a machine is provided. The guard assembly includes a guard structure and a frame. The frame is attachable to the machine at a machine component. The guard structure is pivotably connected to the frame and movable between a first position and a second position. The frame further includes a magnet structure to releasably couple the frame to the machine component. Furthermore, the frame includes a cap being secured to the magnet structure. The cap includes a skirt having at least one side extending beyond the magnet structure and contact at least a portion of the machine component.

In another aspect, a machine is provided. The machine includes at least one machine counterweight and a guard assembly releasably secured to the at least one machine counterweight. The guard assembly includes a guard structure and a frame. The frame is attachable to the at least one machine counterweight. The guard structure is pivotably connected to the frame and movable between a first position and a second position. The frame includes a magnet structure to releasably couple the frame to the at least one machine counterweight. The frame further includes a cap secured to the magnet structure. The cap further includes a skirt having at least one side extending beyond the magnet structure and contact at least a portion of the at least one machine counterweight.

DETAILED DESCRIPTION

Reference will now be made in detail to embodiments of the present disclosure, examples of which are illustrated in the accompanying drawings. Wherever possible, the same reference numbers will be used throughout the drawings to refer to the same or like parts.

Figure 1:
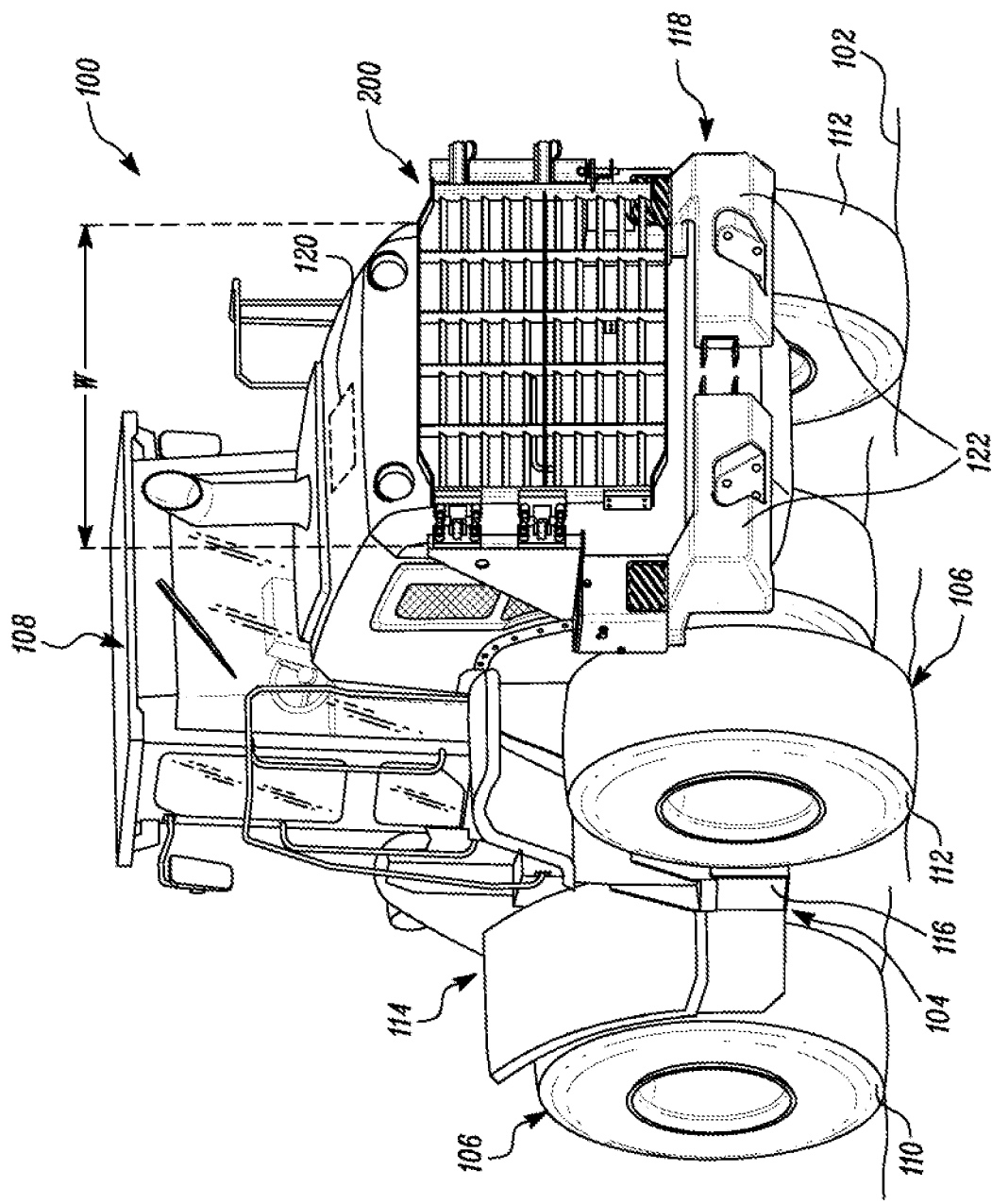
FIG. 1 illustrates an exemplary machine, in accordance with the concepts of the disclosure.

The present disclosure relates to a guard assembly for a machine. FIG. 1 illustrates an exemplary machine 100 configured to operate at a worksite 102. The worksite 102 may include a mine site, a land fill, a quarry, a construction site, or any other type of worksite. As shown in FIG. 1, the machine 100 is embodied as a wheel loader. However, it may be contemplated that the machine 100 may be any type of machine configured to perform some type of operation associated with an industry such as mining, construction, farming, transportation, or any other industry. Other examples of the machine 100 may include, but not limited to, an off-highway truck, a dump truck, an excavator, or the like. Further, the machine 100 may be a manned machine or an unmanned machine. In some embodiments, the machine 100 may be a machine having a various level of autonomy, such as fully-autonomous machine, a semi-autonomous machine, a remotely operated machine, or a remotely supervised machine.

The machine 100 includes a frame assembly 104 that supports various components of the machine 100, such as traction devices 106 and operator cabin 108. In an exemplary embodiment, the traction devices 106, as shown in FIG. 1, include a pair of front wheels 110 and a pair of rear wheels 112. However, in other exemplary embodiments, the traction devices 106 may include endless tracks for maneuvering the machine 100 at the worksite 102.

The frame assembly 104 includes a front frame (not shown) positioned at a front end 114 and a rear frame 116 positioned at a rear end 118 of the machine 100. The front frame of the frame assembly 104 is supported on the front wheels 110 and supports a work implement (not shown), which performs loading operation. In one example, the work implement may be an oversized bucket for moving material or may be any tool used in the performance of a work-related task. In various examples, the work implement may include one or more of a blade, a shovel, a ripper, a dump bed, a fork arrangement, a broom, a grasping device, a cutting tool, a digging tool, a propelling tool, or any other task-performing tool known in the art. The work implement may be operated by an operator sitting in the operator cabin 108.

Further, the rear frame 116 is supported on the rear wheels 112 and supports the operator cabin 108 and a power generation unit 120 of the machine 100. The power generation unit 120 includes an engine to power the various components of the machine 100, such as the traction devices 106. The power generation unit 120 may be based on one of the commonly applied power-generation units, such as an internal combustion engine (ICE) having a V-type configuration engine, an in-line, configuration engine, or an engine with different configurations, as is conventionally known. However, aspects of the present disclosure, need not be limited to a particular type of power generation unit.

The rear frame 116 further supports at least one machine counterweight 122 at the rear end 118 of the machine 100. The counterweight 122 balances the weight load of the machine 100 and is positioned generally opposite the work implement. Furthermore, the machine 100 includes a cooling system (not shown) supported within the rear frame 116 for cooling the power generation unit 120 and various other components of the machine 100, for example, the transmission system of the machine 100. The cooling system may be a conventional cooling system including a radiator for cooling the power generation unit 120 along with other heat exchangers for cooling other fluids.

The machine 100 further includes a guard assembly 200 for protecting one or more components of the machine 100. As shown, the guard assembly 200 is positioned at the rear end 118 of the machine 100 to protect the cooling system of the machine 100. In an embodiment of the present disclosure, the guard assembly 200 is magnetically coupled to the machine 100 at a machine component, such as the machine counterweight 122. The guard assembly 200 and the magnetic coupling of the guard assembly 200 to the machine 100 is further explained in greater detail with respect to the FIG. 2 through FIG. 11.

Figure 2:
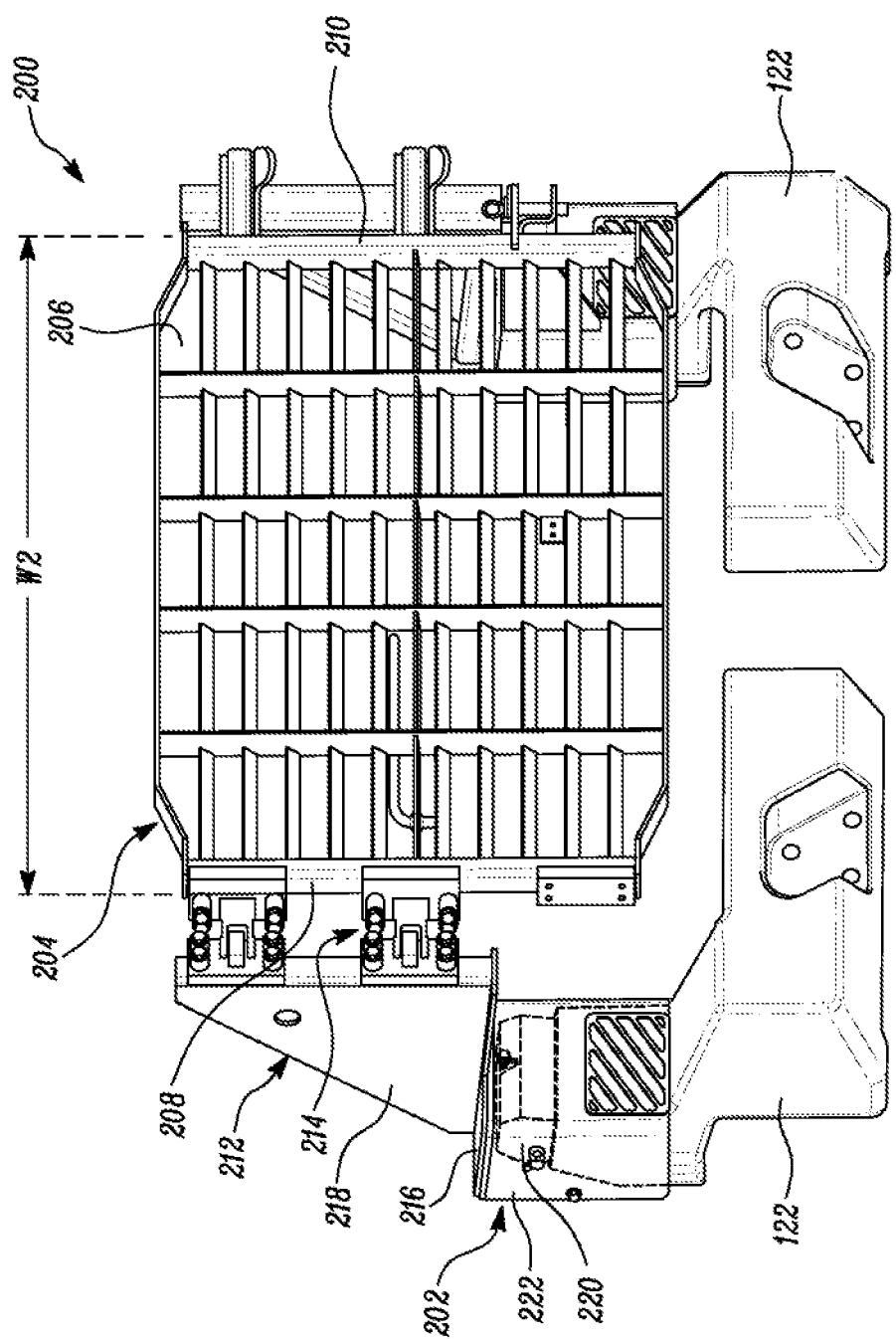
FIG. 2 illustrates an exemplary guard assembly for the machine, in accordance with the concepts of the disclosure.

FIG. 2 illustrates a perspective view of the guard assembly 200, according to an embodiment of the present disclosure. As shown in FIG. 2, the guard assembly 200 includes a frame 202 and a guard structure 204 pivotably coupled to the frame 202 and movable between a first position (i.e., an open position) and a second position (i.e., a closed position). In an embodiment, the frame 202 is magnetically attachable to at least one machine component, such as the machine counterweight 122, thereby magnetically coupling the guard structure 204 to the machine 100 at the machine counterweight 122. It may be contemplated that although the machine component is shown and described to be the machine counterweight 122, other machine components, as desired, may also be implemented for magnetically coupling the guard assembly 200, without deviating from the scope of the claimed subject matter.

The guard structure 204 includes a gate structure 206 having a first side 208 and a second side 210 extending laterally opposite to each other and spanning across a width W of the machine 100 at the rear end 118. As illustrated, the guard structure 204 may include a rectangular metal grill having a width W2 extending between the first side 208 and the second side 210. In an exemplary embodiment, the width W2 of the guard structure 204 is greater than or equal to the width W of the machine 100 at the rear end 118.

As shown in FIG. 2, the frame 202 includes a mounting post 212 pivotally coupled to the first side 208 of the guard structure 204. For the sake of simplicity, coupling of the guard structure 204 to the frame 202 on the first side 208 is only described. However, it may be contemplated that the guard structure 204 is also coupled to a corresponding frame on the second side 210 of the guard structure 204, in the same manner.

The mounting post 212 includes a base portion 216 and a standing portion 218 extending upwards from the base portion 216. The standing portion 218 includes a triangular profile and is substantially perpendicular to the base potion 216. As illustrated, the standing portion 218 of the mounting post 212 is pivotably coupled to the guard structure 204 at the first side 208 by hinges 214, thereby allowing pivotal movement of the guard structure 204 with respect to the mounting post 212 of the frame 202. It may be contemplated that the profile of the mounting post 212 is merely exemplary and may be varied to achieve similar results.

Further, the frame 202 is releasably attached to the machine 100 at the machine counterweight 122, thereby coupling the guard structure 204 to the machine 100 at the machine counterweight 122. In an embodiment of the present disclosure, the frame 202 is magnetically coupled to the machine 100 at the machine counterweight 122. For example, the frame 202 includes a magnet structure 220 positioned on the machine counterweight 122 and a cap 222 covering the magnet structure 220. The cap 222 is attachable to the base portion 216 of the mounting post 212 and is secured to the magnet structure 220, thereby magnetically securing the frame 202 to the machine 100 at the machine counterweight 122, and consequently securing the guard structure 204 to the machine counterweight 122. In an example, the cap 222 is made up of steel or other ferrous metal. The magnet structure 220 and the cap 222 are described in greater detail in the subsequent description.

Figure 3:
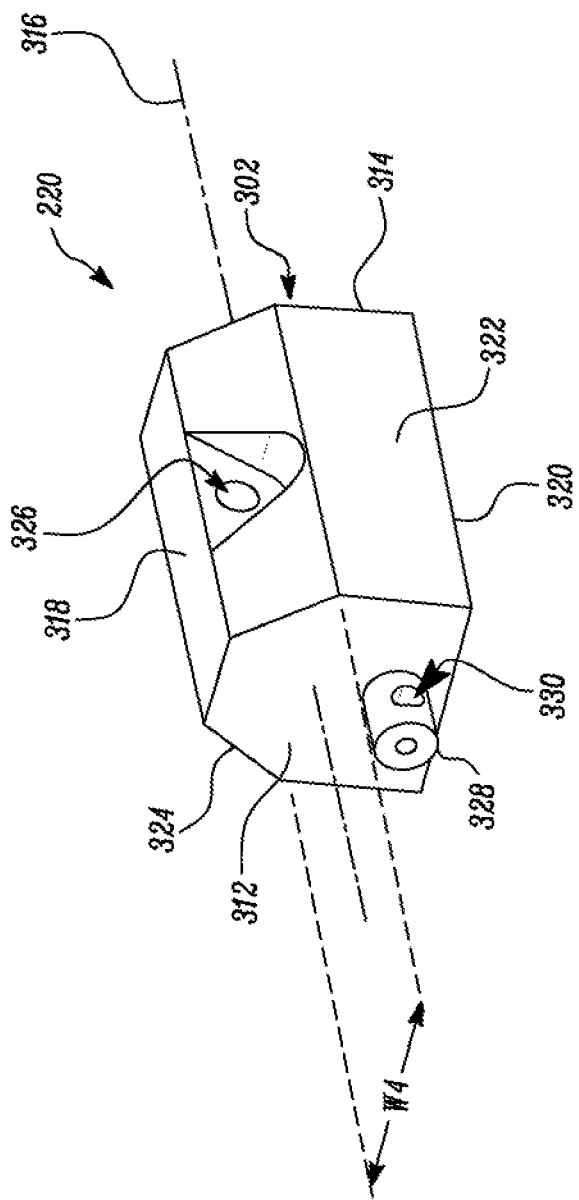
FIG. 3 illustrates a perspective view of a magnet structure of the guard assembly, in accordance with the concepts of the present disclosure.
Figure 4A:
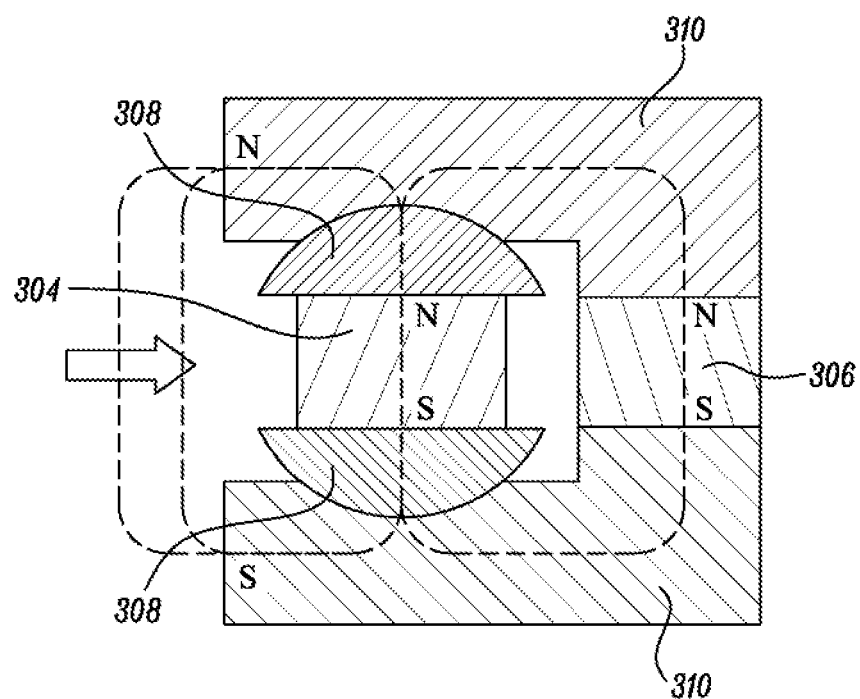
FIG. 4A and FIG. 4B illustrate sectional view of the magnet structure, in accordance with the concepts of the present disclosure.
Figure 4B:
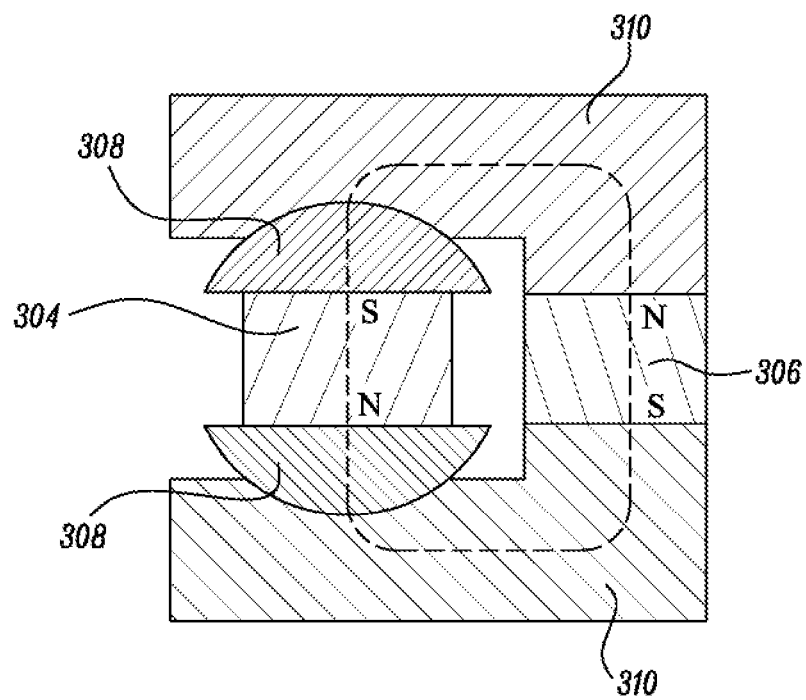

Referring now to FIGS. 3, 4A and 4B, the magnet structure 220 includes a magnet body 302 housing a first permanent magnet 304 and a second permanent magnet 306 (shown in FIGS. 4A and 4B). Each of the first permanent magnet 304 and the second permanent magnet 306 are neodymium permanent magnets that are connected by ferrous metal portions 308 and 310. For example, the ferrous metal portions 308 and 310 may be steel or iron metal portions. The second permanent magnet 306 is stationary while the first permanent magnet 304 is rotatable with respect to the second permanent magnet 306, thereby switching the magnet structure 220 between an ON position (shown in FIG. 4A) and an OFF position (shown in FIG. 4B). For example, in the OFF position, the first permanent magnet 304 is positioned such that the poles of the first permanent magnet 304 oppose that of the second permanent magnet 306, thereby keeping the magnetic field lines internal to the magnet body 302. Therefore, the magnet structure 220 cannot exhibit a magnetic force on the machine counterweight 122 in the OFF position, thereby decoupling the machine counterweight 122 and the magnet structure 220. Similarly, in the ON position, the first permanent magnet 304 is positioned such that poles of the first permanent magnet 304 are aligned with that of the second permanent magnet 306, thereby forcing the magnetic flux to travel outside the magnet body 302. Therefore, the magnet structure 220 creates a pull force on external material of the machine counterweight 122 towards itself, thereby coupling the machine counterweight 122 and the magnet structure 220. As explained previously, the coupling and decoupling of the magnet structure 220 and machine counterweight 122 results in coupling and decoupling of the guard structure 204 to the machine counterweight 122.

Referring back to FIG. 3, the magnet body 302 of the magnet structure 220 includes a first side surface 312 and a second side surface 314 disposed perpendicular to a longitudinal axis 316 of the magnet body 302. Further, the magnet body 302 includes a top surface 318 and a bottom surface 320, such that the bottom surface 320 is in contact with the machine counterweight 122 when the magnet structure 220 is positioned on the machine counterweight 122. Furthermore, the magnet body 302 includes a front face 322 and a back face 324 extending parallel to the longitudinal axis 316 and in between the first side surface 312 and the second side surface 314. In an example, the magnet body 302 defines a trapezoidal profile, as shown in FIG. 3. Additionally, the magnet body 302 includes a fastening aperture 326 provided in proximity to the top surface 318 and extending through and between the front face 322 and the back face 324.

The magnet body 302 further includes a magnet switch 328 operatively coupled to the first permanent magnet 304 and rotate the first permanent magnet 304 to switch the magnet structure 220 between the ON position and the OFF position. As illustrated, the magnet switch 328 is protruding outwardly from the first side surface 312 along the longitudinal axis 316. The magnet switch 328 may have a cylindrical profile and includes an actuation aperture 330 extending therethrough. The actuation aperture 330 facilitates rotation of the magnet switch 328 thereby rotating the first permanent magnet 304 to switch the magnet structure 220 between the ON and the OFF position. In an exemplary embodiment, the magnet switch 328 is magnetically biased to bias the magnet structure 220 to the OFF position. For example, as the poles of the first permanent magnet 304 and the second permanent magnet 306 are aligned in the ON position, the detraction force existing between the two magnets swivel the first permanent magnet 304 back to the OFF position, thereby magnetically biasing the magnet switch 328 to bias the magnet structure 220 to the OFF position.

Figure 5:
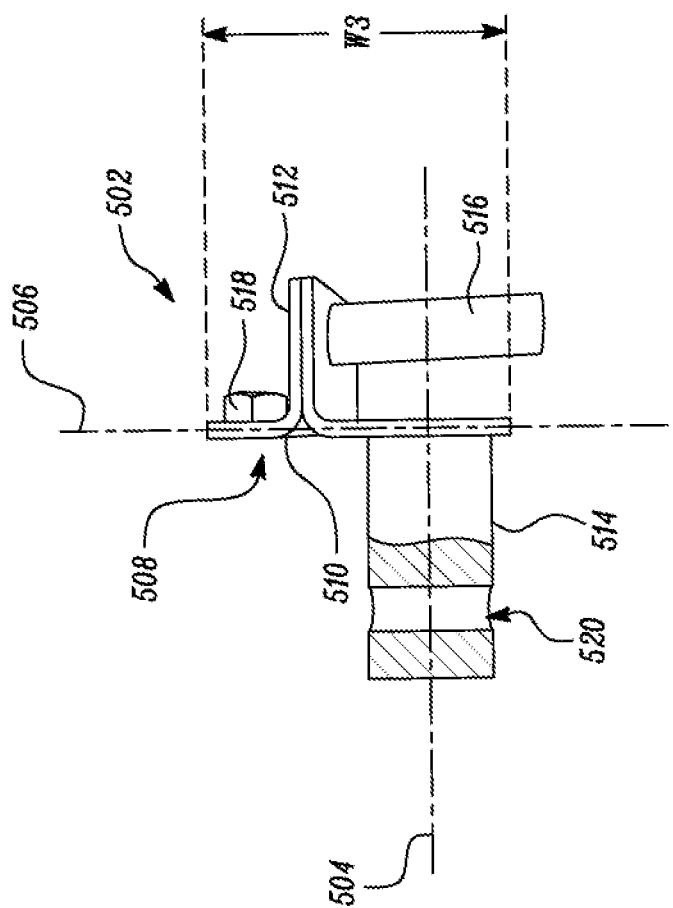
FIG. 5 illustrates a perspective view of a locking member of a frame of the guard assembly, in accordance with the concepts of the present disclosure.

In an embodiment of the present disclosure, as shown in FIG. 5, the frame 202 further includes a locking member 502 for locking the magnet structure 220 and the cap 222 and further locking the magnet structure 220 in the ON position. As illustrated, the locking member 502 defines a rotational axis 504 and a lateral axis 506 perpendicular to the rotational axis 504. The locking member 502 includes a base portion 508 having a first plate 510 and a second plate 512. As shown in FIG. 5, the base portion 508 includes a T-shape profile, having the second plate 512 perpendicular to the first plate 510. The locking member 502 further includes a first connecting member 514 protruding outward from the first plate 510 of the base portion 508 and extending along the rotational axis 504 of the locking member 502. Further, the locking member 502 includes a second connecting member 516 protruding laterally outward from the second plate 512 and extends along the lateral axis 506 of the locking member 502. Furthermore, the locking member 502 includes a securing member 518 provided on the first plate 510 to facilitate locking of the magnet structure 220 in the ON position. In an example, the securing member 516 is a nut fastener.

Referring to FIGS. 3 and 5, the second connecting member 516 is received within the actuation aperture 330 of the magnet switch 328 such that the first connecting member 514 is aligned with the magnet switch 328. The first connecting member 514 further includes a through hole 520 extending laterally through the first connecting member 514 to facilitate rotation of the magnet switch 328 along the rotational axis 504, i.e., between the ON and the OFF position of the magnet structure 220. In an exemplary embodiment of the present disclosure, a width W3 of the locking member 502 is less than a width W4 of the magnet structure 220, thereby keeping the locking member 502 within the cap 222 when rotating the magnet switch 328.

Figure 6:
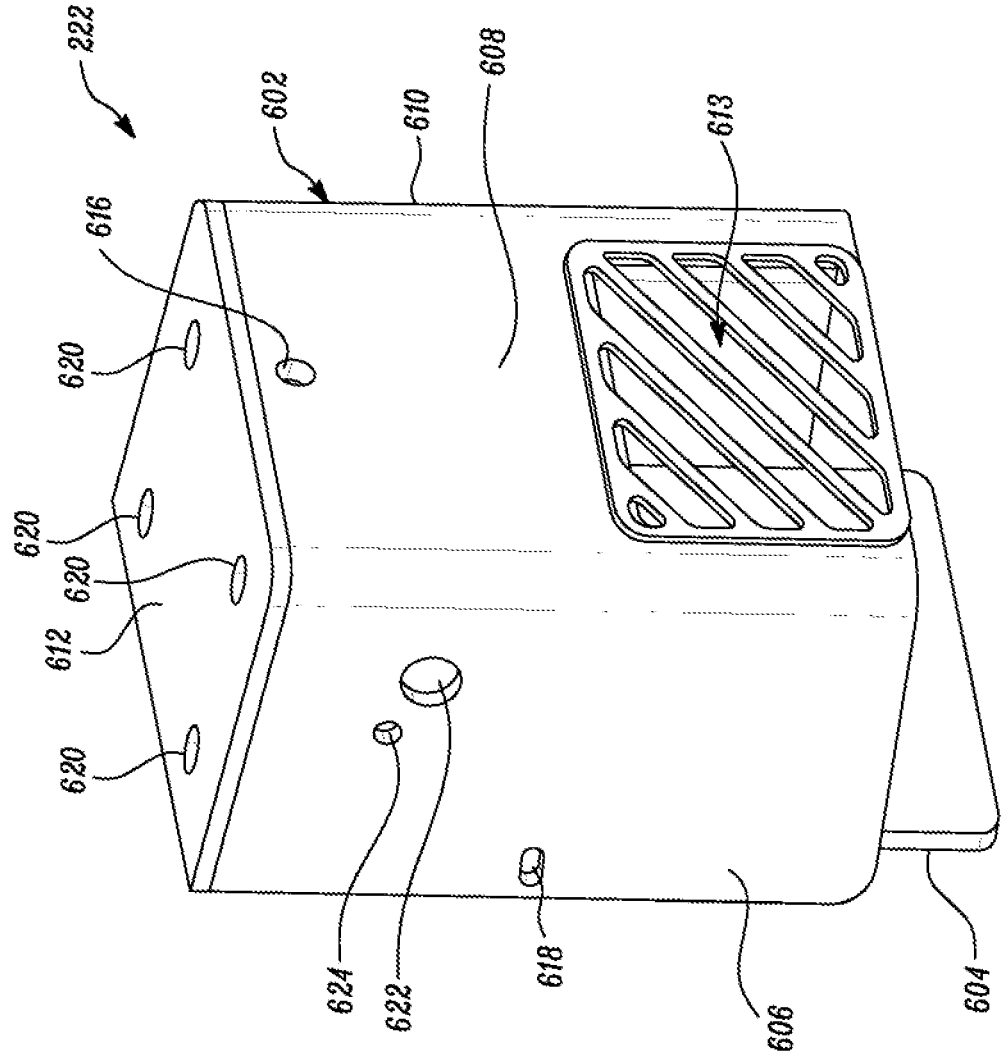
FIG. 6 illustrates a perspective view of a cap of the frame, in accordance with the concepts of the present disclosure.
Figure 7:
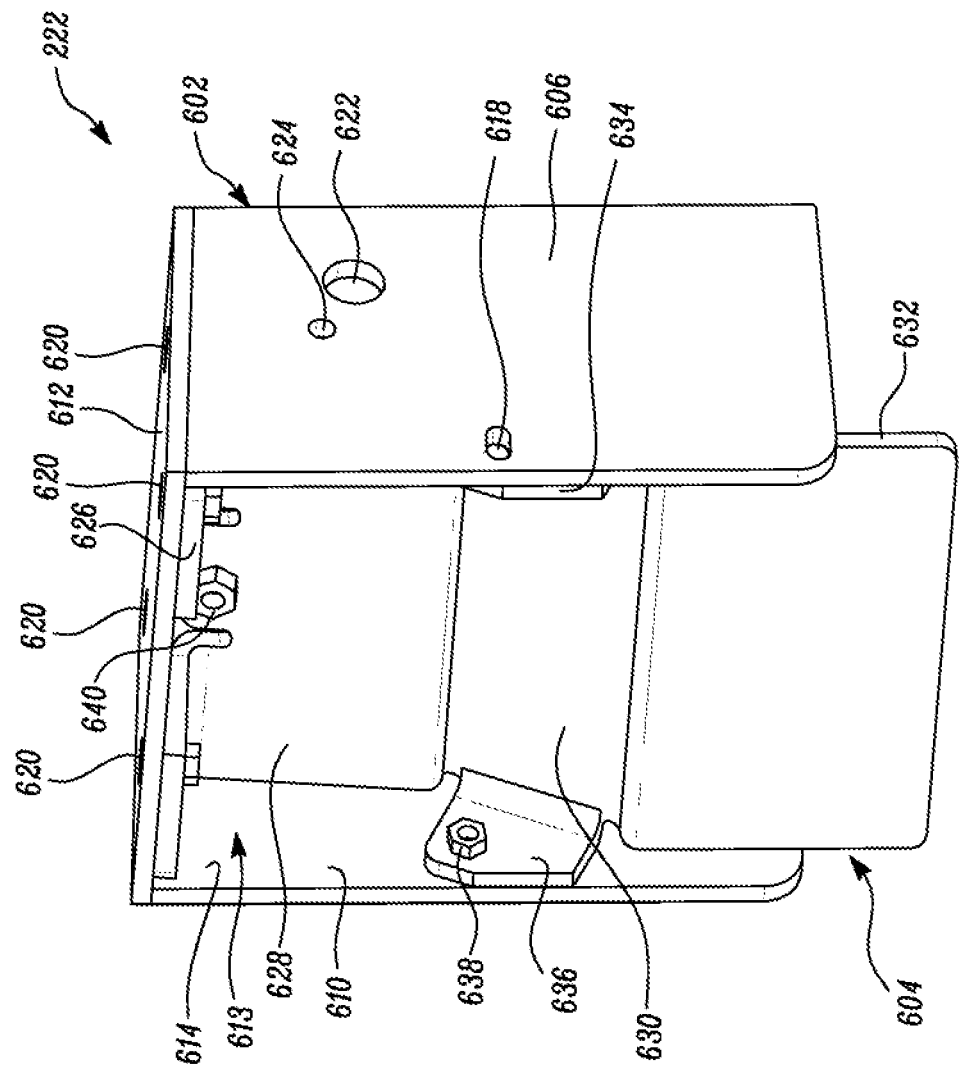
FIG. 7 illustrates a perspective view of the cap including a cover, in accordance with the concepts of the present disclosure.

Referring to FIGS. 6 and 7, the cap 222 includes a skirt 602 and a cover 604 fastened to the skirt 602 to house the magnet structure 220 therein. For example, as shown in FIG. 6, the skirt 602 includes a first plate 606, a second plate 608, a third plate 610 and a top plate 612 that define a receptacle 613 with an internal surface 614 (as shown in FIG. 7). In an embodiment, the skin 602 includes at least one side that extends downwardly beyond the magnet structure 220 and contacts the machine counterweight 122. For example, each of the three plates 606, 608 and 610 extend downwardly beyond the magnet structure 220 to define the receptacle 613 for receiving the magnet structure 220 and the machine counterweight 122 therein, such that the internal surface 614 of the receptacle 613 contacts the magnet structure 220 and the machine counterweight 122.

Furthermore, the skirt 602 includes a securing aperture 616 provided on the second plate 608 and in proximity to the top plate 612, such that the securing aperture 616 aligns with the fastening aperture 326 of the magnet structure 220, when the skirt 602 is positioned around the magnet structure 220. Each of the first plate 606 and the third plate 610 respectively includes a coupling aperture 618 to facilitate coupling of the skirt 602 and the cover 604. Additionally, the top plate 612 includes a number of coupling receptacles 620 to facilitate coupling of the base portion 216 of the mounting post 212 to the skirt 602 of the cap 222.

The skirt 602 further includes an aperture 622 for receiving the first connecting member 514 therethrough to engage the magnet structure 220 with the cap 222. Furthermore, the skirt 602 also includes fastening aperture 624 that aligns with the securing member 518 of the locking member 502 when the magnet switch 328 is rotated to the ON position of the magnet structure 220. Further, the aligned fastening aperture 624 and the securing member 516 receive a fastener therethrough to lock the magnet structure 220 in the ON position.

Further, the cover 604 includes a top plate 626, a first portion 628, a second portion 630, a third portion 632 and a pair of securing tabs 634, 636. The top plate 626 contacts the top surface 612 of the skin 602, and the first portion 628 aligns and contacts the back face 324 of the magnet structure 220 positioned on the machine counterweight 122. Further, the second portion 630 and the third portion 632 of the cover 604 align and contact with the machine counterweight 122. In an exemplary embodiment, the third portion 632 extends downward beyond the skirt 602 to contact the machine counterweight 122.

Further, each of the securing tabs 634, 636 include a fastening element 638 (only one side shown in FIG. 7). The securing tabs 634, 636 contact the first plate 606 and the third plate 610, respectively, such that the fastening elements 638 of each of the securing tabs 634, 636 align with corresponding coupling apertures 601 (only one side shown in FIG. 6) provided on the first plate 606 and the third plate 610 of the skirt 602. The aligned fastening elements 638 and the coupling apertures 618 are bolted together to secure the cover 604 with the skirt 602.

In an embodiment of the present disclosure, the cover 604 further includes a fastening aperture 640 provided in proximity to the top plate 626 such that the fastening aperture 640 aligns with the already aligned securing aperture 616 of the skirt 602 and the fastening aperture 326 of the magnet structure 220. The aligned fastening aperture 640, the securing aperture 616 and the fastening aperture 326 receive a fastener to secure the cover 604, the magnet structure 220 and the skirt 602 together, thereby holding the magnet structure 220 in place inside the cap 222.

INDUSTRIAL APPLICABILITY

The guard assembly 200 of the present disclosure is releasably attachable to a machine component, such as the machine counterweight 122 without requiring any special provisions for mounting required on the machine counterweight 122. In an embodiment of the present disclosure, the guard structure 204 is magnetically coupled to the machine counterweight 122, thereby eliminating any need for special mounting provisions on the machine counterweight 122.

FIGS. 8 to 11 illustrate an exemplary embodiment of method for mounting the guard assembly 200 on a machine component, such as the machine counterweight 122.

Figure 8:
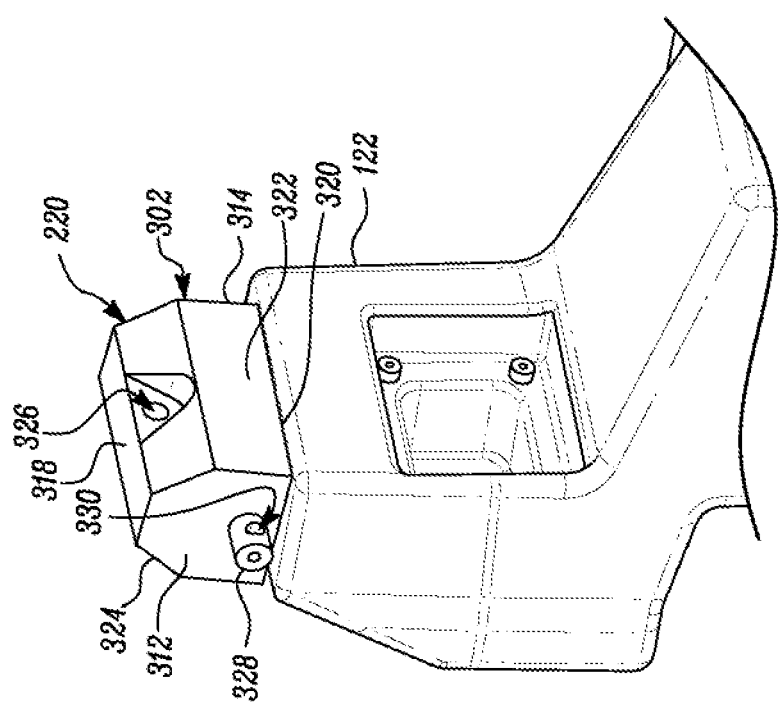
FIGS. 8 to 11 illustrate the steps for mounting the guard assembly to the machine at the machine component, in accordance with the concepts of the present disclosure.

Initially, the magnet structure 220 is positioned on the machine counterweight 122, as shown in FIG. 8. In an exemplary embodiment, the magnet structure 220 includes a first permanent magnet 304 and a second permanent magnet 306 housed within a magnet body 302. The magnet structure 220 is positioned on the machine counterweight 122 in an OFF position.

Figure 9:
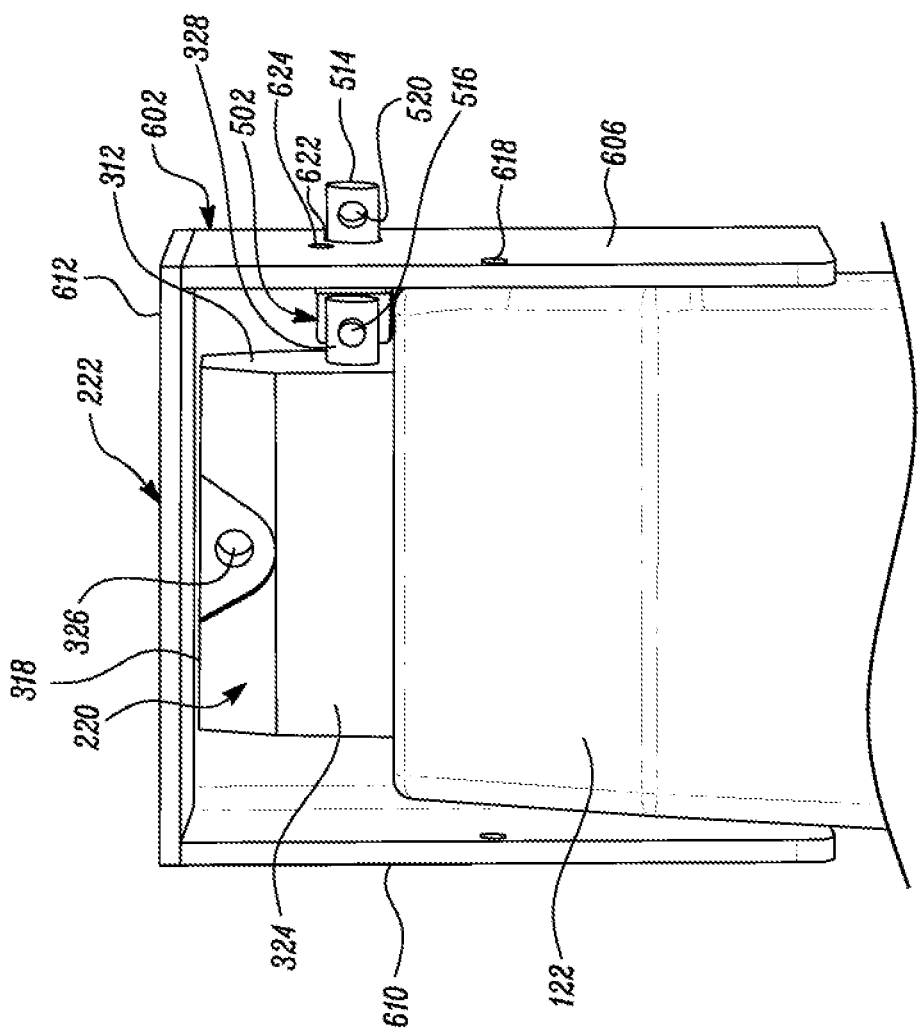

The locking member 502 is positioned to first engage with the skirt 602 of the cap 222 and subsequently with the magnet switch 328 of the magnet structure 220. For example, the aperture 622 of the skirt 602 receives the first connecting member 514 of the locking member 502. Once, the locking member 502 is positioned, the skirt 602 is positioned to receive the magnet structure 220 and the machine counterweight 122 within the receptacle 613, such that the internal surface 614 of the receptacle 613 contacts the magnet structure 220 and the machine counterweight 122, as shown in FIG. 9. For this, the second connecting member 516 of the locking member 502 is inserted within the actuation aperture 330 of the magnet switch 328 while the securing aperture 616 on the skirt 602 aligns with the fastening aperture 326 on the magnet structure 220. At this position, the skirt 602 covers the magnet structure 220 and the machine component 122 from three sides, thereby leaving one side of the magnet structure 220 open. As shown in FIG. 9, the back face 324 is left uncovered after the skirt 602 is positioned on the magnet structure 220 and the machine counterweight 122.

Figure 10:
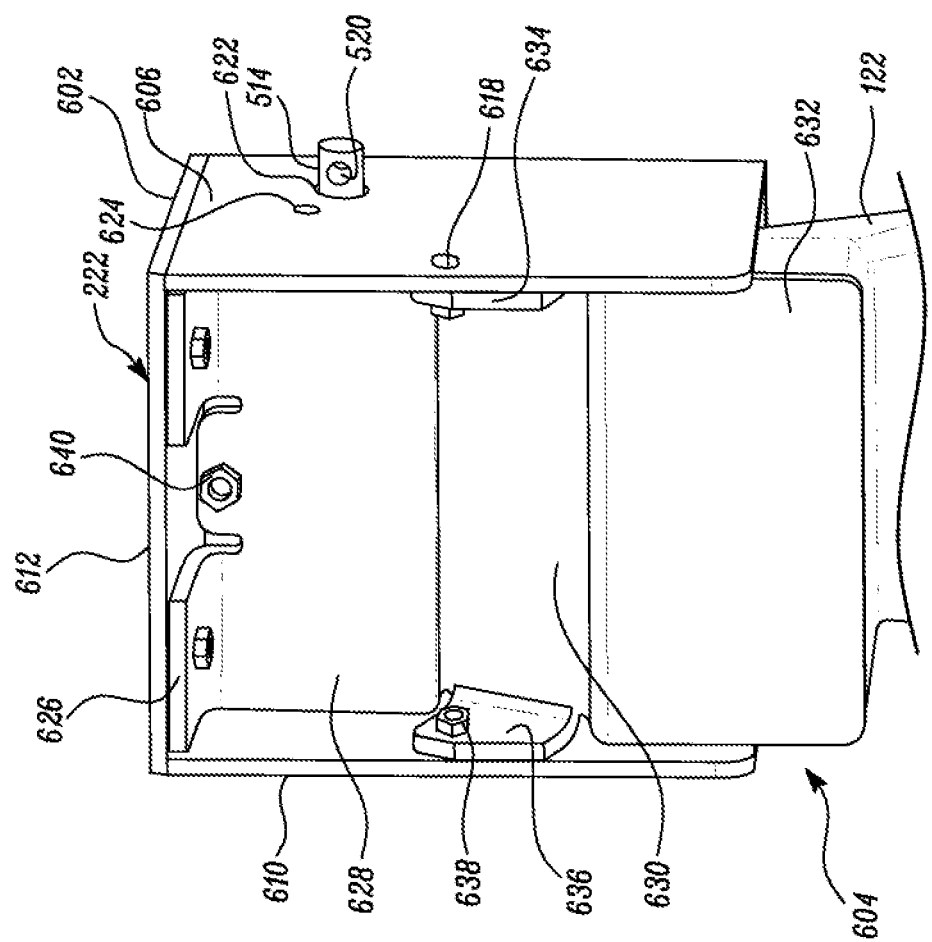

Subsequently, in order to close and enclose the magnet structure 220 within the cap 222, the cover 604 is positioned and secured with the skirt 602. For example, as shown in FIG. 10, the cover 604 is positioned such that top plate 626 of the cover 604 contacts the top plate 612 of the skin 602. The first portion 628 of the cover 604 aligns and contacts with the back face 324 of the magnet structure 220 and the remaining second portion 630 and the third portion 632 align and contact the machine counterweight 122.

Furthermore, the fastening aperture 640 of the cover 604 aligns with the already aligned securing aperture 616 on the skirt 602 and the fastening aperture 326 on the magnet structure 220. The aligned apertures are bolted together to secure the cover 604 to the magnet structure 220 and the skirt 602. The fastening elements 638 on the securing tabs 636, 634 of the cover 604 are also aligned and bolted to the corresponding coupling apertures 618 on the skirt 602, thereby securing the skirt 602 and the cover 604 together to form the cap 222 and eliminating all the gaps between the cap 222 and the machine counterweight 122.

The skirt 602 and the cover 604 are designed to match the contour of the magnet structure 220 and the machine counterweight 122, thereby allowing the cap 222 to be clamped to the machine counterweight 122 by minimizing a clearance between the cap 222 and the machine counterweight 122. Furthermore, the profile of the skirt 602 and the cover 604 facilitate holding the magnet structure 220 in place when the magnet structure 220 is in the ON position during operation.

Figure 11:
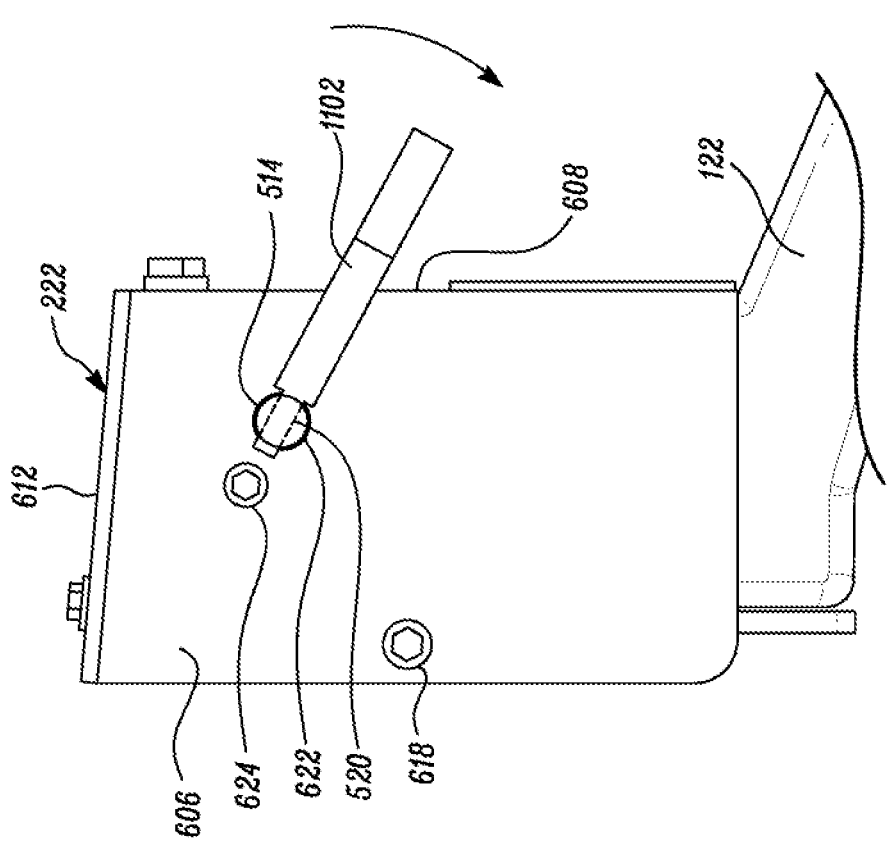

Further, once the magnet structure 220 is positioned within the cap 222 of the frame 202 and the all the components are secured properly, the magnet structure 220 is switched to the ON position. For example, as shown in FIG. 11, an external actuator, such as a rod 1102, is used to rotate the magnet structure 220 to the ON position. The rod 1102 is engaged within the through hole 520 of the first connecting member 514 extending out from the first plate 606 of the skirt 602. Subsequently, the rod 1102 is rotated anti-clockwise to rotate the first permanent magnet 304 and switch the magnet structure 220 to the ON position. Once the magnet structure 220 is switched to the ON position, the securing member 518 on the locking member 502 aligns with the fastening aperture 624 on the first plate 606 of the skirt 602. The aligned securing member 518 and the fastening aperture 624 are then bolted to lock the magnet structure 220 in the ON position.

Furthermore, as the magnet structure 220 is switched to the ON position, the cap 222 is magnetically secured to the machine counterweight 122. Now, the mounting post 212 along with the guard structure 204 is subsequently secured to the top plate 612 of the skirt 602, by fasteners such as bolts. For example, the base potion 218 of the mounting post 212 is bolted to the top plate 612 of the skirt 602.

The above method steps are repeated to magnetically secure the guard structure 204 on both first side 208 and the second side 210 to the respective frames 202 and the respective machine counterweights 122. Further, in order to decouple the guard structure 204 from the cap 222, the magnet structure 220 may be switched to the OFF position and the mounting post 212 may be unbolted from the top plate 612 of the skirt 602. Subsequently, the cover 604 may be unfastened at all the respective places from the skirt 602, thereby disassembling the cap 222 and the magnet structure 220.

The guard assembly 200 of the present disclosure provides easy assembling and disassembling of the guard structure 204 to the machine counterweight 122, without requiring any additional mounting provisions on the machine counterweight 122. This significantly reduces costs and labor and improves the operation of the machine 100. Further, the magnet structure 220 holds the cap 222 in place while the cap 222 absorbs any induced load from impacts to the guard assembly 200 and transfers it to the counterweight 122. Therefore, the guard assembly 200 of the present disclosure also provides a stable and strong mounting provision for the guard structure 204 on the machine counterweight 122.

Other embodiments will be apparent to those skilled in the art from consideration of the specification and practice of the system disclosed herein. It is intended that the specification and examples be considered as exemplary only, with a true scope of the disclosure being indicated by the following claims and their equivalent.

What is claimed is:

1. A guard assembly for a machine, the guard assembly comprising:
    a guard structure;
    a frame attachable to the machine at a machine component, the guard structure being pivotably connected to the frame and movable between a first position and a second position, the frame including:
        a magnet structure to releasably couple the frame to the machine component; and
        a cap being secured to the magnet structure, the cap including a skirt having at least one side extending beyond the magnet structure and contacting at least a portion of the machine component.

2. The guard assembly of claim 1, wherein the machine component is a machine counterweight.

3. The guard assembly of claim 1, wherein the frame includes at least one mounting post coupled to the skirt and the guard structure.

4. The guard assembly of claim 3, wherein the skirt includes a top plate having at least one coupling receptacle to facilitate coupling of the skirt to the mounting post.

5. The guard assembly of claim 1, wherein the magnet structure includes a first permanent magnet and a second permanent magnet housed within a magnet body, the magnet body including a magnet switch operatively coupled to the first permanent magnet for rotating the first permanent magnet and switching the magnet structure between an ON position and an OFF position.

6. The guard assembly of claim 5, wherein the frame further includes a locking member to lock the magnet structure in the ON position to couple the guard structure to the machine component.

7. The guard assembly of claim 6, wherein the locking member includes:
    a first connecting member to interface and engage with the skirt;
    a second connecting member to engage with the magnet structure and facilitate rotation of the first permanent magnet to switch the magnet structure between the ON position and the OFF position; and
    a securing member to lock the magnet structure in the ON position.

8. The guard assembly of claim 1, wherein the skirt defines a receptacle having an internal surface for receiving and contacting with at least a portion of the magnet structure and the machine component.

9. The guard assembly of claim 1, wherein the cap includes a cover to be secured to the skirt and enclose the magnet structure and the machine component therein.

10. The guard assembly of claim 9, wherein the cover extends downward beyond the skirt to contact the machine component.

11. The guard assembly of claim 9, wherein the skirt includes a securing aperture aligned with a fastening aperture of the magnet structure and a fastening aperture of the cover to facilitate fastening of the magnet structure with the skirt and the cover of the cap.

12. A machine comprising:
    at least one machine counterweight;
    a guard assembly releasably secured to the at least one machine counterweight, the guard assembly including;
        a guard structure;
        a frame attachable to the at least one machine counterweight, the guard structure being pivotably connected to the frame and movable between a first position and a second position, the frame including:
            a magnet structure to releasably couple the frame to the at least one machine counterweight; and
            a cap being secured to the magnet structure, the cap including a skirt having at least one side extending beyond the magnet structure and contacting at least a portion of the at least one machine counterweight.

13. The machine of claim 12, wherein the frame includes at least one mounting post coupled to the skirt and the guard structure.

14. The machine of claim 13, wherein the skirt includes a top plate having at least one coupling receptacle to facilitate coupling of the skirt to the mounting post.

15. The machine of claim 12, wherein the magnet structure includes a first permanent magnet and a second permanent magnet housed within a magnet body, the magnet body including a magnet switch operatively coupled to the first permanent magnet and rotate the first permanent magnet to switch the magnet structure between an ON position and an OFF position.

16. The machine of claim 15, wherein the frame further includes a locking member to lock the magnet structure in the ON position to couple the guard structure to the at least one machine counterweight.

17. The machine of claim 16, wherein the locking member further including:
    a first connecting member to interface and engage with the skirt;
    a second connecting member to engage with the magnet structure and facilitate rotation of the first permanent magnet to switch the magnet structure between the ON position and the OFF position; and
    a securing member to releasably lock the magnet structure in the ON position.

18. The machine of claim 12, wherein the skirt defines a receptacle having an internal surface for receiving and contacting with at least a portion of the magnet structure and the at least one machine counterweight.

19. The machine of claim 12, wherein the cap includes a cover secured to the skirt to enclose the magnet structure and at least a portion of the at least one machine counterweight therein.

20. The machine of claim 19, wherein the cover extends downward beyond the skirt to contact the at least one machine counterweight.

* * * * *